US012135896B2

(12) United States Patent
Mishina et al.

(10) Patent No.: US 12,135,896 B2
(45) Date of Patent: Nov. 5, 2024

(54) SIDE-EFFECT RESISTANT OPERATION TESTING

(71) Applicant: INTERNATIONAL BUSINESS MACHINES CORPORATION, Armonk, NY (US)

(72) Inventors: Takuya Mishina, Kanagawa (JP); Yasuharu Katsuno, Kawasaki (JP); Takahide Nogayama, Kanagawa (JP); Fumiko Akiyama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 738 days.

(21) Appl. No.: 16/529,184

(22) Filed: Aug. 1, 2019

(65) Prior Publication Data

US 2021/0034279 A1 Feb. 4, 2021

(51) Int. Cl.
*G06F 3/06* (2006.01)
*G06F 16/901* (2019.01)

(52) U.S. Cl.
CPC .......... *G06F 3/0653* (2013.01); *G06F 3/0604* (2013.01); *G06F 3/0667* (2013.01); *G06F 3/0674* (2013.01); *G06F 16/9017* (2019.01)

(58) Field of Classification Search
CPC .. G06F 3/0653; G06F 16/9017; G06F 3/0604; G06F 3/0667; G06F 3/0674
See application file for complete search history.

(56) References Cited

U.S. PATENT DOCUMENTS

| | | | | |
|---|---|---|---|---|
| 8,412,754 B2 * | 4/2013 | Chen | G06F 9/45537 707/831 |
| 10,338,966 B2 * | 7/2019 | Chen | G06F 9/4881 |
| 2012/0143929 A1 * | 6/2012 | Baratakke | G06F 16/188 707/827 |
| 2017/0083541 A1 * | 3/2017 | Mann | G06F 16/119 |
| 2018/0246741 A1 | 8/2018 | Kairali et al. | |
| 2018/0365238 A1 * | 12/2018 | Eder | G06F 16/176 |

FOREIGN PATENT DOCUMENTS

CN 108415795 A 3/2018

* cited by examiner

*Primary Examiner* — Mark D Featherstone
*Assistant Examiner* — Faezeh Forouharnejad
(74) *Attorney, Agent, or Firm* — Tutunjian & Bitetto, P.C; Robert Richard Aragona

(57) ABSTRACT

Operation testing without side effects may be enabled by a method including preparing a copy of a directory set of at least a part of a host system disk, creating a link to a file in a first directory in the host system disk, in a second directory of the copy of the directory set, wherein the second directory corresponds in position to the first directory in the directory set, and starting a non-privileged system using a disk image including the copy of the directory set and the created link.

25 Claims, 8 Drawing Sheets

Preparing Section 110
Creating Section 120
Starting Section 130
Testing Section 140
Storing section 100
Apparatus

10

SIDE-EFFECT RESISTANT OPERATION TESTING

BACKGROUND

Technical Field

The present invention relates to side-effect resistant operation testing.

Description of the Related Art

Operation testing is necessary to check whether a system operates without errors. During an operation test, an operation to a host system may cause unintentional side effects. Especially when executed with a privileged level of access, the operation may cause crucial side effects.

Container technologies may create an execution environment which is isolated from the host system. For example, the host system may be copied to a container and the operation test may be performed in the container. However, this needs a large amount of time and disk space. Alternate approaches to container systems also need many technological and procedural resources.

SUMMARY

According to an aspect of the present invention, provided is a method, including preparing a copy of a directory set of at least a part of a host system disk, creating a link to a file in a first directory in the host system disk, in a second directory of the copy of the directory set, wherein the second directory corresponds in position to the first directory in the directory set, and starting a non-privileged system using a disk image including the copy of the directory set and the created link. The method may or may not at least partially be computer-implemented. According to this aspect, the apparatus may perform the operation test of the host system with a reduced amount of time and disk space.

According to another aspect of the present invention, optionally provided is the method of the preceding aspect, further including: replacing the link to the file in the first directory in the host system disk with a copy of the file, in response to receiving a request to write the file. According to this aspect, the apparatus can perform the operation test of the host system with a reduced amount of time and disk space.

The foregoing aspect may also include an apparatus configured to perform the computer-implemented method, and a computer program product storing instructions embodied on a computer-readable medium or programmable circuitry, that, when executed by a processor or the programmable circuitry, cause the processor or the programmable circuitry to perform the computer-implemented method. The summary clause does not necessarily describe all features of the embodiments of the present invention. Embodiments of the present invention may also include sub-combinations of the features described above.

DETAILED DESCRIPTION

Hereinafter, example embodiments of the present invention will be described. The example embodiments shall not limit the invention according to the claims, and the combinations of the features described in the embodiments are not necessarily essential to the invention.

Figure 1:
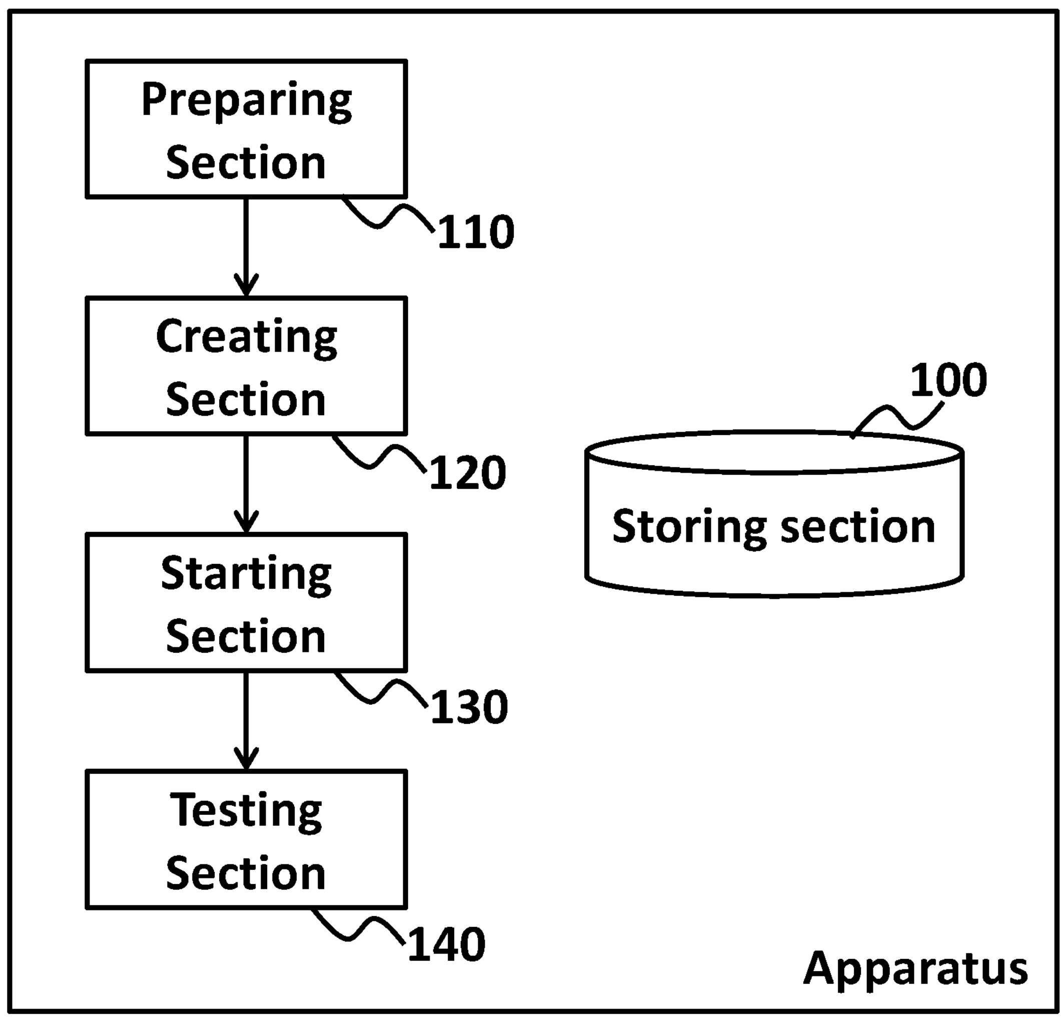
FIG. 1 shows an exemplary configuration of an apparatus 10, according to an embodiment of the present invention.

FIG. 1 shows an exemplary configuration of an apparatus 10, according to an embodiment of the present invention. The apparatus 10 may perform an operation test without causing side-effect. In an embodiment, the apparatus 10 itself may be an apparatus under test.

The apparatus 10 may include a processor and/or programmable circuitry. The apparatus 10 may further include one or more computer readable mediums collectively including instructions. The instructions may be embodied on the computer readable medium and/or the programmable circuitry. The instructions, when executed by the processor or the programmable circuitry, may cause the processor or the programmable circuitry to operate as a plurality of operating sections.

Thereby, the apparatus 10 may be regarded as including a storing section 100, a preparing section 110, a creating section 120, a starting section 130, and a testing section 140.

The storing section 100 stores information used for the processing that the apparatus 10 performs. The storing section 100 may also store a variety of data/instructions used for operations of the apparatus 10. One or more other elements in the apparatus 10 (e.g., the preparing section 110, the creating section 120, the starting section 130, and the testing section 140) may communicate data directly or via the storing section 100, as necessary.

The storing section 100 may be implemented by a volatile or non-volatile memory of the apparatus 10. In an embodiment, the storing section 100 may be implemented by a hard disc device or a system memory. In some embodiments, the storing section 100 may store at least one of a container system, a virtual machine, a host system, a copy of a directory set of a host system, and other data related thereto.

The preparing section 110 may prepare a copy of a directory set of at least a part of a host system disk. Thereby, the preparing section may duplicate a directory structure of the host system.

The creating section 120 may create a link to a file in a first directory in the host system disk. The creating section 120 may create the link in a second directory of the copy of the directory set. The second directory may correspond in position to the first directory in the directory set.

The starting section 130 may start a non-privileged system using a disk image including the copy of the directory set and the link created by the creating section 120.

The testing section 140 may perform an operation test by using the non-privileged system.

As explained above, the apparatus 10 may copy the host system disk but files in the copy of the host system disk are replaced with links to the files. Thereby the apparatus 10 may prepare the non-privileged system represented by the copied host system disk.

The apparatus 10 may further perform the operation test using the non-privileged system. Thereby, the apparatus may not affect the host system itself during the operation test.

In an embodiment, the non-privileged system may be a container system. In the embodiment, the apparatus 10 may use a container image of a container system as the copy of the host system disk. In the embodiment, the preparing section 110 may prepare the copy of the directory set by using an existing container image of the container system.

Figure 2:
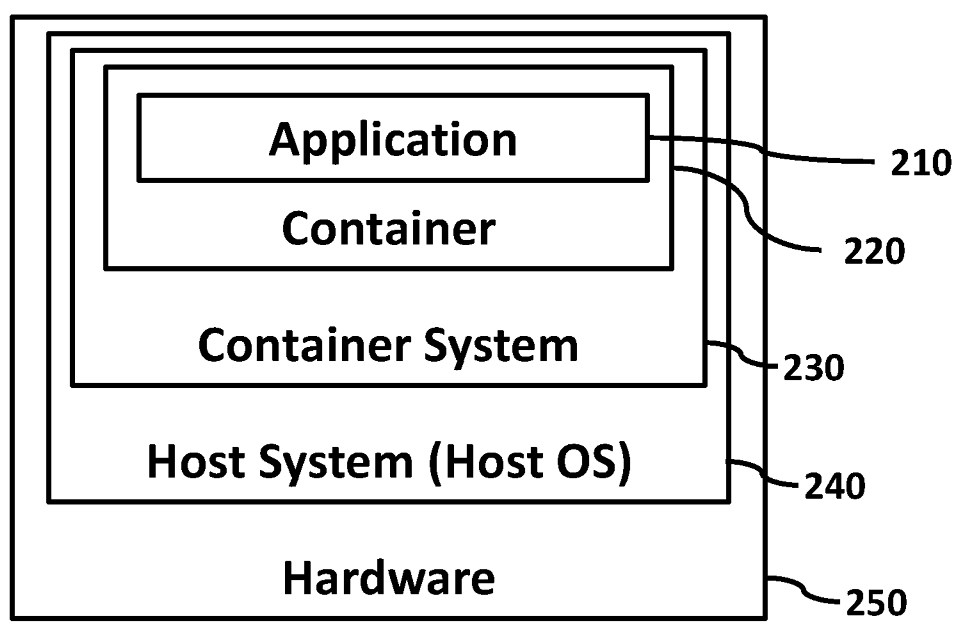
FIG. 2 shows an exemplary framework of container system, according to an embodiment of the present invention.

FIG. 2 shows an exemplary framework of a container system, according to an embodiment of the present invention. As shown in FIG. 2, an application 210 operates on a container 220, which is an application execution environment. A container system 230 provides one or more containers 220. The container system 230 may be a container engine such as Docker, or Virtualbox. The container system 230 may operate on a host system (host OS) 240. Hardware 250 may run the host system 240.

According to the embodiment, the apparatus 10 may avoid any side-effects of an operation test, by using functions of the container system 230 such as: capability control to shutdown, network namespace isolation against modification of iptables, process namespace isolation against kill, layerFS against file write, and/or cgroups control against I/O.

Figure 3:
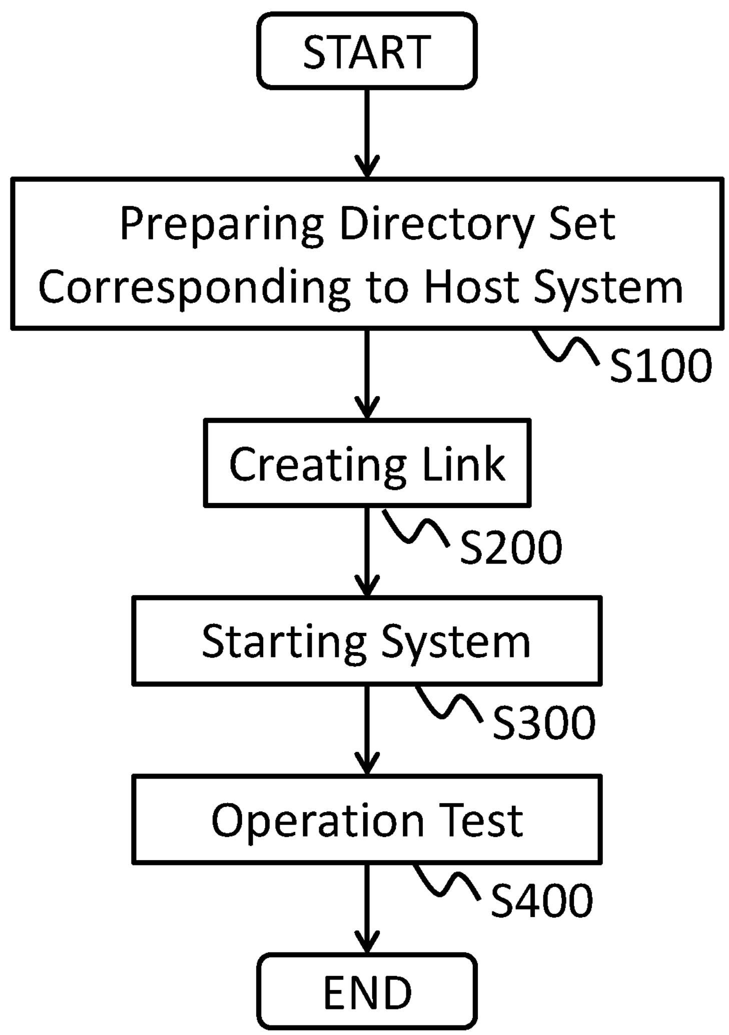
FIG. 3 shows an operational flow according to an embodiment of the present invention.

FIG. 3 shows an operational flow according to an embodiment of the present invention. The present embodiment describes an example in which an apparatus, such as the apparatus 10, performs operations from S100 to S400, as shown in FIG. 3, to perform an operation test without side effects. In the embodiments explained in relation to FIG. 3, the apparatus that implements the container systems are explained.

Before starting the operation of S100, the container system, such as Docker, is installed in the host system. The host system disk may initially include a plurality of directories and files therein.

Figure 4:
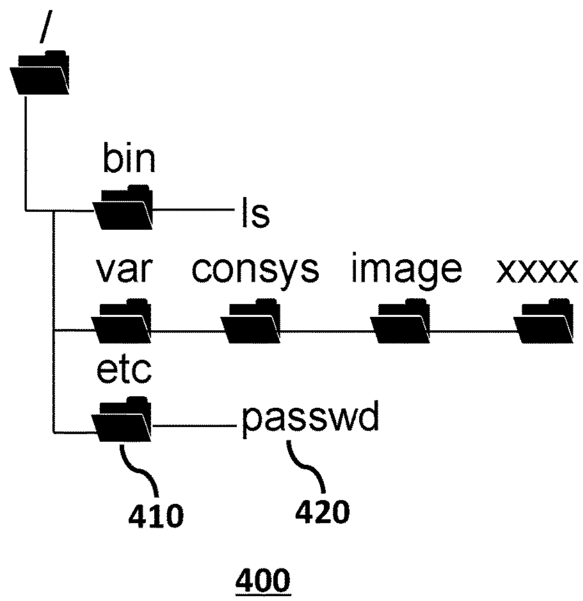
FIG. 4 shows a host system disk according to an embodiment of the present invention.

FIG. 4 shows a host system disk according to an embodiment of the present invention. In the embodiment of FIG. 4, the host system disk 400 of a host system may include a plurality of directories 410 and a plurality of files 420. The plurality of directories 410 include a root directory (shown as "/"), and subdirectories (shown as "bin", "var", "consys", "image", "xxxx", and "etc").

The plurality of files 420 may include files (shown as "ls" and "passwd"). The plurality of files 420 may include other files not shown in FIG. 4, which is for explanation purposes. The host system disk 400 includes directories associated with a container system such as the directories "consys", "image", and "xxxx." The directory "xxxx" is the lowest level directory among the container system associated directories.

At S100, a preparing section, such as the preparing section 110, may prepare a copy of a directory set of at least a part of a host system disk. In an embodiment, the preparing section may copy all directories of the host system disk, as the directory set, except a root directory (e.g., "/" directory in FIG. 4), and the lowest level directory among the container system associated directories (such as "xxxx" directory in FIG. 4).

The preparing section may copy the directory set such that the copy of the directory set is located in a sub-directory within the host system disk. In an embodiment, the copy of the directory set is located in a sub-directory of the lowest level directory among the container system associated directories.

Figure 5:
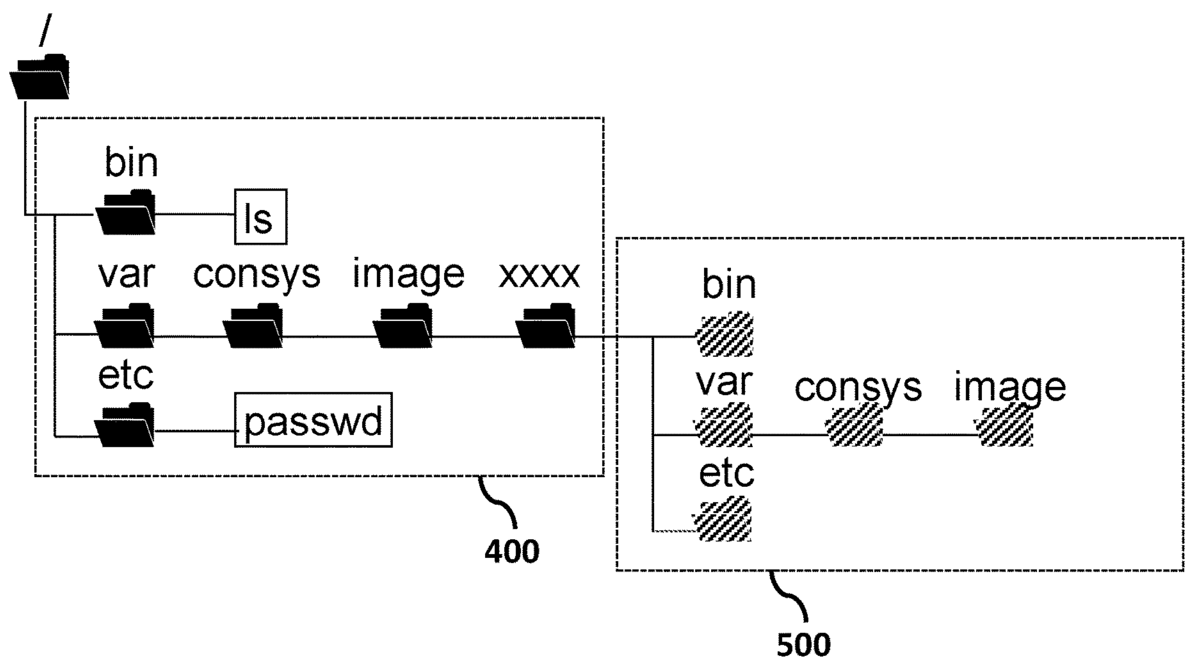
FIG. 5 shows a copy of directory set according to an embodiment of the present invention.

FIG. 5 shows a copy of a directory set according to an embodiment of the present invention. In an embodiment, the preparing section may add a copy of the directory set 500 to the host system disk 400 as shown in FIG. 5. The copy of the directory set 500 is located in the directory "xxxx", and includes directories shown as "bin", "var", "etc", "consys", and "image." The directories of the directory set 500 may not include files included in the host system disk 400 (e.g., files "ls" and "passwd").

In an embodiment, the preparing section may reuse an existing directory of the container image (such as consys image) as the directories of the copy of the directory set 500. An example of such an embodiment is explained in association with FIG. 6.

Figure 6:
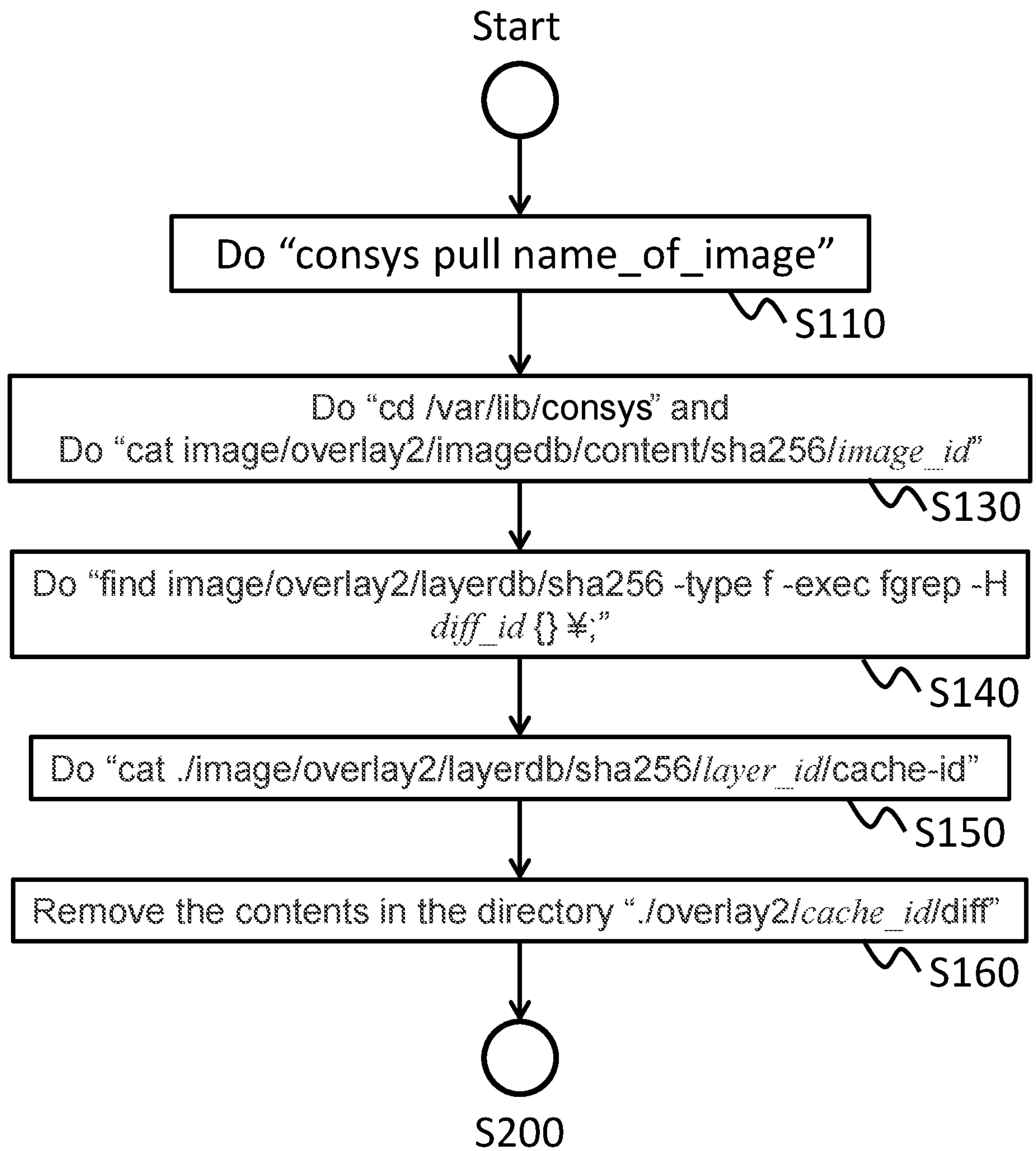
FIG. 6 shows a sub-flow of S100 in the flow of FIG. 3 according to an embodiment of the present invention.

FIG. 6 shows a sub-flow of S100 in the flow of FIG. 3 according to an embodiment of the present invention. The preparing section may perform operations of S110-S160 of FIG. 6 at the operation S100 of FIG. 3.

At S110, the preparing section may perform "consys pull name_of_image." Thereby, the preparing section may obtain an image ID of consys image. In an embodiment, the preparing section may obtain output as shown below: root@vagrant:/var/lib/consys# consys images REPOSITORY TAG IMAGE ID CREATED SIZE test1 latest 81660fca76ce 38 minutes ago 114 MB In the output, "81660fca76ce" is the image ID.

At S130, the preparing section may perform "cd /var/lib/consys" and "cat image/overlay2/imagedb/content/sha256/image_id." Thereby, the preparing section may obtain a list of diff-IDs in a path "rootfs/diff ids". In an embodiment, the preparing section may obtain output as shown below:

```
{ ... "rootfs": { "type": "layers", "diff_ids": [
"sha256:644879075e24394efef8a7dddefbc133aad42002df6223cacf98bd1e3d5ddde2",
"sha256:d7ff1dc646ba52a02312b535446d6c9b72cd09fda0480524e4828554efb2f748",
"sha256:686245e78935e73b737c9a82111c3c7df35f5529d06ce8c2f9a7cd32ec90b456",
"sha256:d73dd9e652956dccbbef716de4b172cc15fff644cc92fc69d221cc3a1cb89a39",
"sha256:2de391e51d731ba02b708038a7f98b7103061b916727bcd165e9ee6402f4cdde",
"sha256:90625910be4a5100a8829ea614fb7b024809378f71c35faa7985c2e80b618a66" ] } }
```

Then the preparing section may select and store a diff-ID among diff-IDs in a list of diff-IDs. In an embodiment, the preparing section may store the last diff-ID among diff-IDs in the list. For example, the preparing section may obtain "90625910be4a5100a8829ea614fb7b024809378f71c35faa7985c2e80b618a66" as the selected diff-ID.

At S140, the preparing section may perform "find image/overlay2/layerdb/ sha256-type f-exec fgrep -H diff id { }\;." Thereby, the preparing section may identify, in "image/overlay2/layerdb/", a layer ID that is associated with the diff-ID selected at S130. In an embodiment, the preparing section may obtain output as shown below:

```
root@vagrant:/var/lib/consys# find image/overlay2/layerdb/sha256 -type f -exec fgrep -H
90625910be4a5100a8829ea614fb7b024809378f71c35faa7985c2e80b618a66 { } \;
image/overlay2/layerdb/sha256/0e31969cf406c587bcb69826a31e14208b0121117d7c478610ef3029
99cfacc2/diff:sha256:90625910be4a5100a8829ea614fb7b024809378f71c35faa7985c2e80b618a66
```

In the embodiment, the preparing section may obtain a layer ID "0e31969cf406c587bcb69826 a31e14208b0121117d7c478610ef302999cfacc2" which is associated with the selected diff ID "90625910be4a5100a8829ea614fb7b0248 09378f71c35faa7985c2e80b618a66."

At S150, the preparing section may perform "cat./image/overlay2/layerdb /sha256/layer_id/cache-id." Thereby the preparing section may obtain a cache ID that is associated with the layer ID obtained at S140. In an embodiment, the preparing section may obtain output as shown below:

```
root@vagrant:/var/lib/consys# cat
./image/overlay2/layerdb/sha256/0e31969cf406c587bcb69826a31e14208b0121117d7c478610ef302
999cfacc2/cache-id
27b2b4fddf41ea541f3df7c341a3c944e13b9272c0522922f71d9f26ac7e484d
```

In the embodiment, the preparing section obtains a cache ID "27b2b4fddf41ea541f3df7c341a3c944e13b9272c05229 22f71d9f26ac7e484d", which is associated with the layer ID "0e31969cf406c587bcb69826a31e14208b0121117d7c4786 10ef302999cfacc2." In the embodiment, the directory "./overlay2/cache_id/diff" contains the actual contents for the container image. Therefore, the directory "./overlay2/cache_id/diff" may correspond to the directory "xxxx" in FIG. 4.

At S160, the preparing section may remove at least a part of the contents in the directory "./overlay2/cache_id/diff." In an embodiment, the preparing section may delete all files in the directory "./overlay2/cache_id/diff."

After an operation of S100 (e.g., S110-S160), the apparatus performs an operation of S200. At S200, a creating section, such as the creating section 120, may create a link to a file in a first directory in the host system disk. In an embodiment, the link may be a hard link. The creating section may locate the link in a second directory of the copy of the directory set. The second directory may correspond in position to the first directory in the directory set.

In an embodiment, the creating section may create links to all files in the host system disk 400. In an embodiment, the creating section may create links to less than all files in the host system disk 400. In an embodiment, the creating section may create links to some files in the host system disk 400, and create copies of all or less than all files in the host system disk 400.

Figure 7:
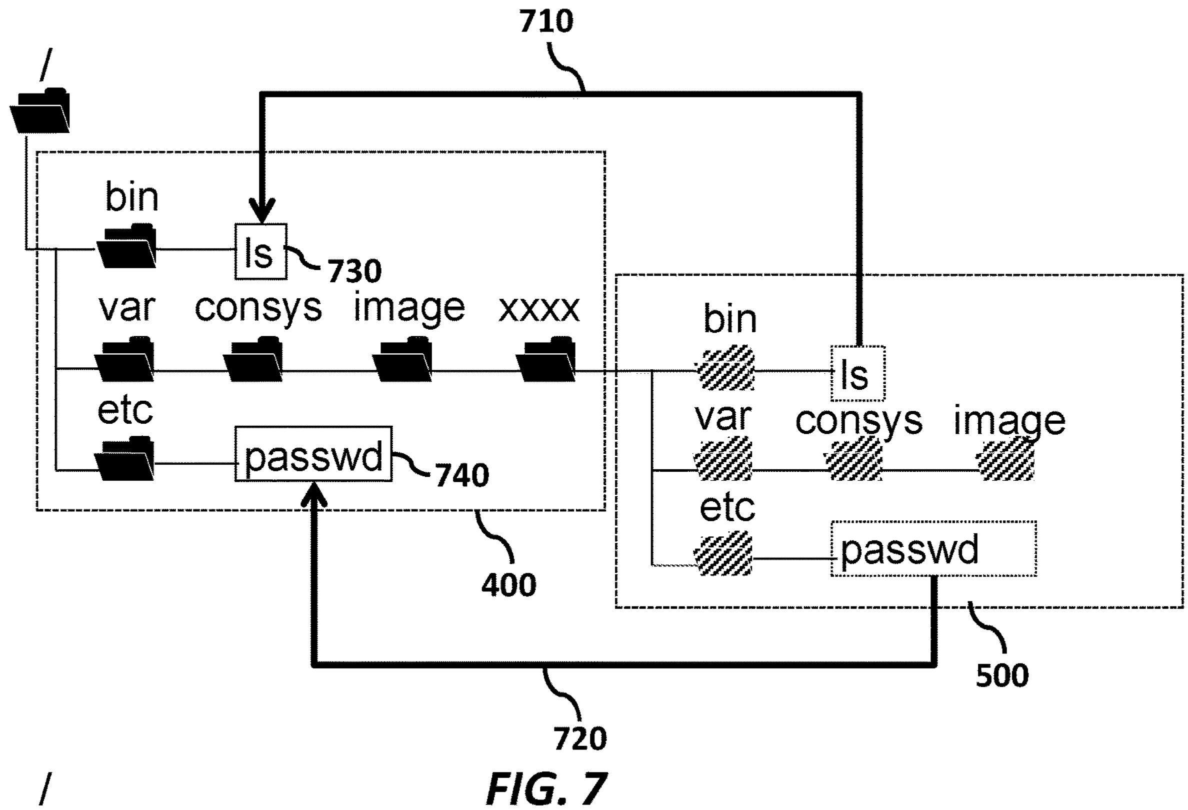
FIG. 7 shows links to files according to an embodiment of the present invention.

FIG. 7 shows links to files according to an embodiment of the present invention. In the embodiment of FIG. 7, the creating section may create a link 710 and a link 720. The link 710 is located in the second directory "bin" in the copy of the directory set 500 and is directed to a file "ls" 730 in the first directory "bin" in the host system disk 400 of the host system. The link 720 is located in the second directory "etc" in the copy of the directory set 500 and is directed to a file "passwd" 740 in the first directory "etc" in the host system disk 400.

According to the embodiments, the creating section may create links to files in the host system disk 400 of the host system, rather than create copies of these files. Therefore, the apparatus may reduce disk space usage without increased technological and procedural resources.

At S300, a starting section, such as the starting section 130, may start a non-privileged system using a disk image including the copy of the directory set and the link created at S200. In an embodiment, the starting section may start a container system using the copy of the directory set 500 prepared at S200.

At S400, a testing section, such as the testing section 140, may perform an operation test by using the non-privileged system. In an embodiment, the testing section may perform the operation test by using the container system using the copy of the directory set 500 prepared at S200. Thereby, the testing section may complete the operation test as if using a privileged system, such as the host system, without affecting the host system.

The during the operation test, the testing section may perform copy-on-write on files in the copy of the directory set 500. In an embodiment, the testing section may replace the link to the file in the first directory in the host system disk with a copy of the file, in response to receiving a request to write the file.

Figure 8:
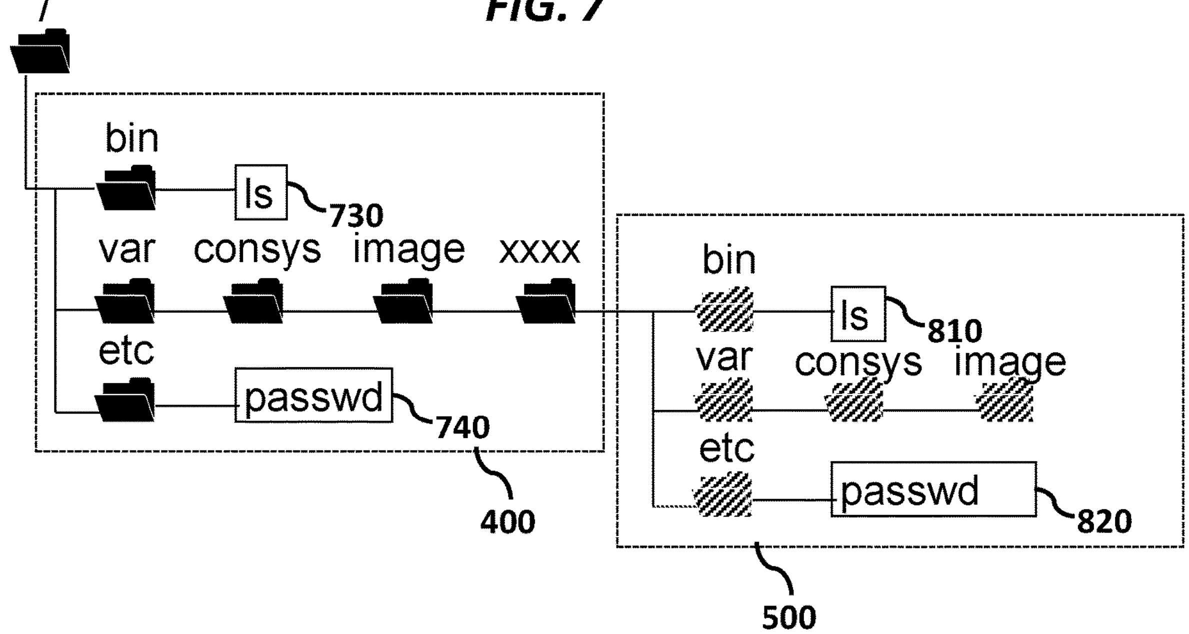
FIG. 8 shows copy-on-write operation according to an embodiment of the present invention.

FIG. 8 shows copy-on-write operation according to an embodiment of the present invention. In the embodiment of FIGS. 7-8, the testing section may replace the link 710 with a copy "ls" 810 of the file "ls" 730 in the first directory "bin." The testing section may also replace the link 720 with a copy "passwd" 820 of the file "passwd" 740 in the first directory "etc."

In an embodiment, the starting section may start the non-privileged system on the host system. In the embodiment, a system under test (e.g., the host system) is the same as a system performing the test.

In another embodiment, the starting section may start the non-privileged system by a remote system other than the host system. In the embodiment, a system under test (e.g., the host system) is different from a system performing the test (e.g., the apparatus 10).

In embodiments above, the non-privileged system is mainly the container system. In another embodiment, the non-privileged system may be the virtual machine instead of the container system. In the embodiment, the apparatus 10 may use a virtual image of a virtual machine as the copy of the directory set 500 shown in FIG. 5. In the embodiment, the preparing section 110 may prepare the copy of the directory set in a virtual image for a virtual machine.

Figure 9:
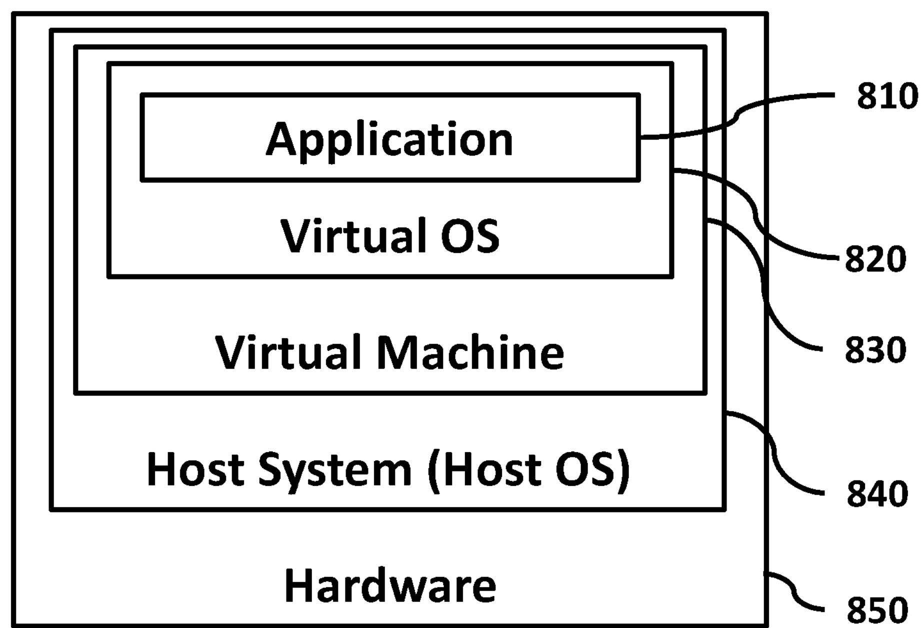
FIG. 9 shows an exemplary framework of virtual machine system, according to an embodiment of the present invention.

FIG. 9 shows an exemplary framework of virtual machine system, according to an embodiment of the present invention. As shown in FIG. 9, an application 810 operates on a virtual OS 820. The application 810 regards the virtual OS 820 as a host OS. A virtual machine 830 provides one or more virtual OS 820. The virtual machine 830 may be implemented by virtual machine software such as KVN, Hyper-V, and ESXi. The virtual machine 830 operates on a host system (host OS) 840. A hardware 850 runs the host system 840.

Conventional virtual technology (e.g., container systems and virtual machines) can usually not access the host system. With the embodiments above, the apparatus may perform the operation test with access to the host system without affecting the contents of the host system (e.g., the host system disk 400). In addition, according to the embodiments above, the apparatus may perform the operation test of the host system with a reduced amount of time and disk space because a copy of the files in the host system disk is not necessary.

Furthermore, in the embodiments above, it is not necessary to modify the code of a hypervisor, such as the container system and/or the virtual machine. Therefore, increased technological and procedural resources may not be needed for such modification.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
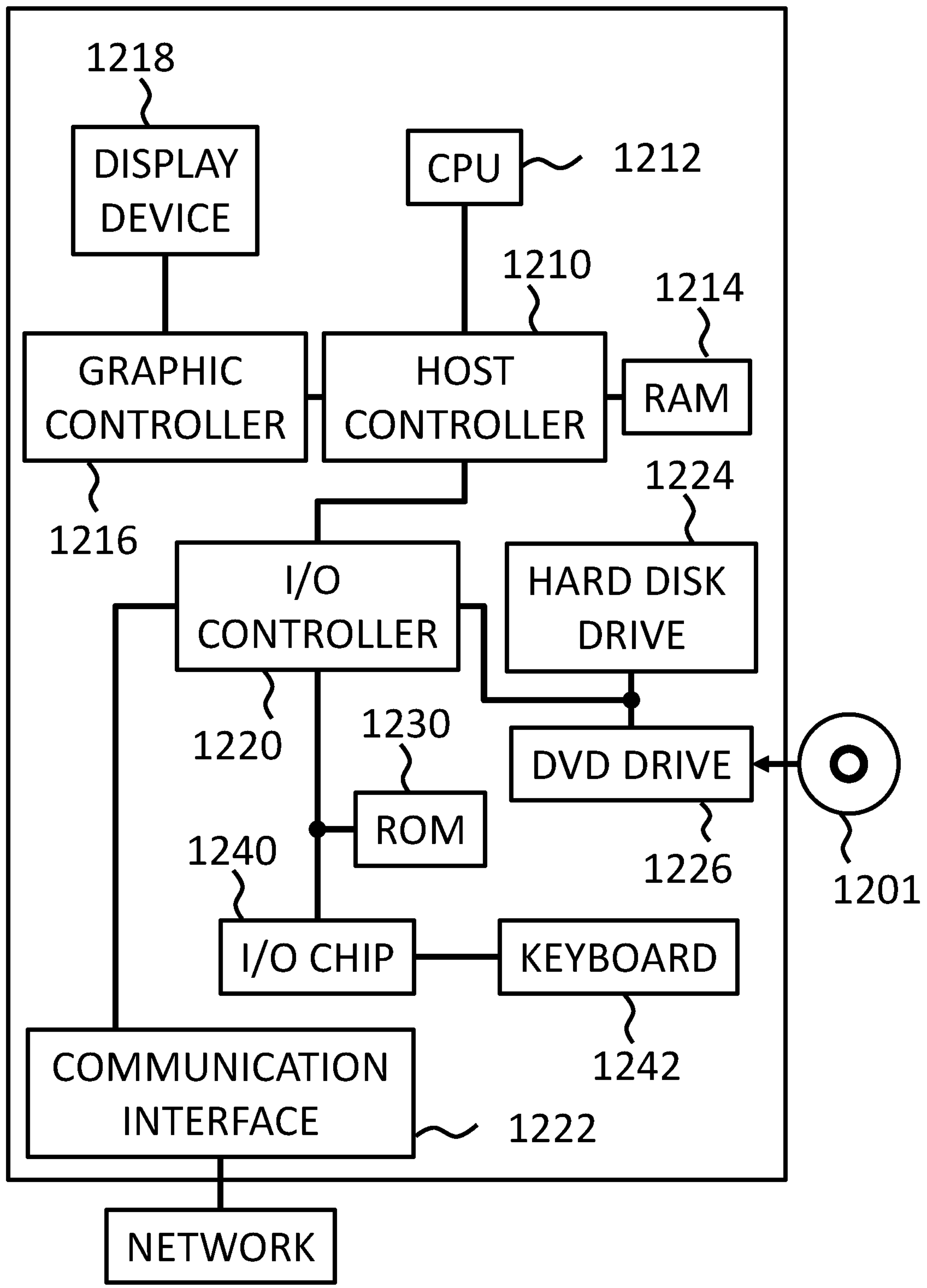
FIG. 10 shows an exemplary hardware configuration of a computer that functions as a system, according to an embodiment of the present invention.

FIG. 10 shows an example of a computer 1200 in which aspects of the present invention may be wholly or partly embodied. A program that is installed in the computer 1200 can cause the computer 1200 to function as or perform operations associated with apparatuses of the embodiments of the present invention or one or more sections thereof, and/or cause the computer 1200 to perform processes of the embodiments of the present invention or steps thereof. Such a program may be executed by the CPU 1212 to cause the computer 1200 to perform certain operations associated with some or all of the blocks of flowcharts and block diagrams described herein.

The computer 1200 according to the present embodiment includes a CPU 1212, a RAM 1214, a graphics controller 1216, and a display device 1218, which are mutually connected by a host controller 1210. The computer 1200 also includes input/output units such as a communication interface 1222, a hard disk drive 1224, a DVD-ROM drive 1226 and an IC card drive, which are connected to the host controller 1210 via an input/output controller 1220. The computer also includes legacy input/output units such as a ROM 1230 and a keyboard 1242, which are connected to the input/output controller 1220 through an input/output chip 1240.

The CPU 1212 operates according to programs stored in the ROM 1230 and the RAM 1214, thereby controlling each unit. The graphics controller 1216 obtains image data generated by the CPU 1212 on a frame buffer or the like provided in the RAM 1214 or in itself, and causes the image data to be displayed on the display device 1218.

The communication interface 1222 communicates with other electronic devices via a network. The hard disk drive 1224 stores programs and data used by the CPU 1212 within the computer 1200. The DVD-ROM drive 1226 reads the programs or the data from the DVD-ROM 1201, and provides the hard disk drive 1224 with the programs or the data via the RAM 1214. The IC card drive reads programs and data from an IC card, and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a parallel port, a serial port, a keyboard port, a mouse port, and the like to the input/output controller 1220.

A program is provided by computer readable media such as the DVD-ROM 1201 or the IC card. The program is read from the computer readable media, installed into the hard disk drive 1224, RAM 1214, or ROM 1230, which are also examples of computer readable media, and executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffering region provided in a recording medium such as the RAM 1214, the hard disk drive 1224, the DVD-ROM 1201, or the IC card, and transmits the read transmission data to a network or writes reception data received from a network to a reception buffering region or the like provided on the recording medium.

In addition, the CPU 1212 may cause all or a necessary portion of a file or a database to be read into the RAM 1214, the file or the database having been stored in an external recording medium such as the hard disk drive 1224, the DVD-ROM drive 1226 (DVD-ROM 1201), the IC card, etc., and perform various types of processing on the data on the RAM 1214. The CPU 1212 may then write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, processing of information, condition judging, conditional branch, unconditional branch, search/replace of information, etc., as described throughout this disclosure and designated by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is designated, from among the plurality of entries, and read the attribute value of the second attribute stored in the entry, thereby obtaining the attribute value of the second attribute associated with the first attribute satisfying the predetermined condition.

The above-explained program or software modules may be stored in the computer readable media on or near the computer 1200. In addition, a recording medium such as a hard disk or a RAM provided in a server system connected to a dedicated communication network or the Internet can be used as the computer readable media, thereby providing the program to the computer 1200 via the network.

While the embodiments of the present invention have been described, the technical scope of the invention is not limited to the above described embodiments. It will be apparent to persons skilled in the art that various alterations and improvements can be added to the above-described embodiments. It should also apparent from the scope of the claims that the embodiments added with such alterations or improvements are within the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed:

1. A method to create a side-effect free operation test system, comprising:

removing all contents of an existing directory of a container image in a memory, creating a copy of a directory set of at least a part of a host system disk in the existing directory after removing the contents, creating a separate link to each file in a first directory in the host system disk, in a second directory of the copy of the directory set, wherein the second directory corresponds in position to the first directory in the directory set, and starting a non-privileged system using a disk image including the copy of the directory set and the created link.

2. The method of claim 1, wherein the copy of the directory set is located in a sub-directory within the host system disk.

3. The method of claim 1, further comprising:

performing an operation test by using the non-privileged system.

4. The method of claim 1, further comprising:

replacing the link to the file in the first directory in the host system disk with a copy of the file, in response to receiving a request to write the file.

5. The method of claim 1, wherein the creating the copy of the directory set includes using an existing container image of a container system, and wherein the non-privileged system is a container system.

6. The method of claim 1, wherein the creating the copy of the directory set is in a virtual image for a virtual machine, and wherein the non-privileged system is the virtual machine.

7. The method of claim 1, wherein the starting the non-privileged system is performed on the host system.

8. The method of claim 1, wherein the starting the non-privileged system is performed on a remote system other than the host system.

9. An apparatus comprising a processor or a programmable circuitry; and one or more computer readable mediums collectively including instructions that, when executed by the processor or the programmable circuitry, cause the processor or the programmable circuitry to perform operations including:

removing all contents of an existing directory of a container image in a memory, creating a copy of a directory set of at least a part of a host system disk in the existing directory after removing the contents, creating a separate link to each file in a first directory in the host system disk, in a second directory of the copy of the directory set, wherein the second directory corresponds in position to the first directory in the directory set, and starting a non-privileged system using a disk image including the copy of the directory set and the created link.

10. The apparatus of claim 9, wherein the copy of the directory set is located in a sub-directory within the host system disk.

11. The apparatus of claim 9, wherein the operation further comprises:

performing an operation test by using the non-privileged system.

12. The apparatus of claim 9, wherein the operation further comprises:

replacing the link to the file in the first directory in the host system disk with a copy of the file, in response to receiving a request to write the file.

13. The apparatus of claim 9, wherein the creating the copy of the directory set includes using an existing container image of a container system, and wherein the non-privileged system is a container system.

14. The apparatus of claim 9, wherein the creating the copy of the directory set is in a virtual image for a virtual machine, and wherein the non-privileged system is the virtual machine.

15. The apparatus of claim 9, wherein the starting the non-privileged system is performed on the host system.

16. The apparatus of claim 9, wherein the starting the non-privileged system is performed on a remote system other than the host system.

17. A computer program product including one or more computer readable storage mediums collectively storing program instructions that are executable by a processor or programmable circuitry to cause the processor or programmable circuitry to perform operations comprising:

removing all contents of an existing directory of a container image in a memory, creating a copy of a directory set of at least a part of a host system disk in the existing directory after removing the contents, creating a separate link to each file in a first directory in the host system disk, in a second directory of the copy of the directory set, wherein the second directory corresponds in position to the first directory in the directory set, and starting a non-privileged system using a disk image including the copy of the directory set and the created link.

18. The computer program product of claim 17, wherein the copy of the directory set is located in a sub-directory within the host system disk.

19. The computer program product of claim 17, wherein the operation further comprises:

performing an operation test by using the non-privileged system.

20. The computer program product of claim 17, wherein the operation further comprises:

replacing the link to the file in the first directory in the host system disk with a copy of the file, in response to receiving a request to write the file.

21. The computer program product of claim 17, wherein the creating the copy of the directory set includes using an existing container image of a container system, and wherein the non-privileged system is a container system.

22. The computer program product of claim 17, wherein the creating the copy of the directory set is in a virtual image for a virtual machine, and wherein the non-privileged system is the virtual machine.

23. The computer program product of claim 17, wherein the starting the non-privileged system is performed on the host system.

24. The computer program product of claim 17, wherein the starting the non-privileged system is performed on a remote system other than the host system.

25. A computer readable medium storing the program of claim 17.

* * * * *